(12) United States Patent
Pearce et al.

(10) Patent No.: US 11,108,909 B2
(45) Date of Patent: *Aug. 31, 2021

(54) SYSTEM, METHOD, AND COMPUTER PROGRAM PRODUCT FOR CONTACT CENTER MANAGEMENT

(71) Applicant: BalanceCXI, Inc., Austin, TX (US)

(72) Inventors: Daniel L. Pearce, Lowell, MI (US); Timothy N. Lavin, Austin, TX (US)

(73) Assignee: BalanceCXI, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,434

(22) Filed: Jun. 29, 2020

(65) Prior Publication Data

US 2020/0329142 A1 Oct. 15, 2020

Related U.S. Application Data

(63) Continuation of application No. 16/424,003, filed on May 28, 2019, now Pat. No. 10,701,207, which is a continuation of application No. 15/864,415, filed on Jan. 8, 2018, now Pat. No. 10,306,064, which is a continuation of application No. 14/487,544, filed on Sep. 16, 2014, now Pat. No. 9,866,690, which is a
(Continued)

(51) Int. Cl.
*H04M 3/51* (2006.01)
*G06Q 30/00* (2012.01)
*H04M 3/493* (2006.01)
*G06Q 30/02* (2012.01)

(52) U.S. Cl.
CPC .......... *H04M 3/5175* (2013.01); *G06Q 30/01* (2013.01); *G06Q 30/016* (2013.01); *G06Q 30/0281* (2013.01); *H04M 3/493* (2013.01); *H04M 3/5166* (2013.01)

(58) Field of Classification Search
USPC ..... 379/88.01, 88.08, 88.09, 112.01, 112.06, 379/265.02, 265.03
See application file for complete search history.

(56) References Cited

U.S. PATENT DOCUMENTS

| | | |
|---|---|---|
| 6,556,659 B1 | 4/2003 | Bowman-Amuah |
| 7,224,790 B1 | 5/2007 | Bushey et al. |
| | (Continued) | |

OTHER PUBLICATIONS

Notification of Transmittal of the International Search Report and the Written Opinion of the International Search Authority, or the Declaration for International Patent Application No. PCT/US2010/054727 dated Sep. 12, 2012.

*Primary Examiner* — Yosef K Laekemariam
(74) *Attorney, Agent, or Firm* — Jeffri A. Kaminski; Venable LLP

(57) ABSTRACT

A system, method, and computer program product for customer contact management via voice, chat, e-mail and social network contacts includes a balanced service process (BSP) that includes a plurality of cause or response codes for maximizing first contact resolution (FCR) and CSAT. The BSP is incorporated within a contact center (single center, multiple centers and/or work at home), which receives voice calls, SMS messages, email, chat, or social media communications from customers. The BSP in real-time determines dispositions of such contacts, monitors and manages the performance of individual resolvers by incorporating machine learning in said BSP

24 Claims, 17 Drawing Sheets

Related U.S. Application Data continuation-in-part of application No. 13/409,467, filed on Mar. 1, 2012, now Pat. No. 8,838,788.

(60) Provisional application No. 61/549,918, filed on Oct. 21, 2011, provisional application No. 61/538,405, filed on Sep. 23, 2011.

(56) References Cited

U.S. PATENT DOCUMENTS

| | | | |
|---|---|---|---|
| 8,149,996 B2* | 4/2012 | Nelson | H04M 3/5116 |
| | | | 379/45 |
| 8,300,797 B1* | 10/2012 | Benesh | H04M 3/5175 |
| | | | 379/265.03 |
| 2007/0195944 A1 | 8/2007 | Korenblit et al. | |
| 2008/0112557 A1 | 5/2008 | Ricketts | |
| 2008/0250264 A1 | 10/2008 | Hourselt et al. | |
| 2010/0332287 A1* | 12/2010 | Gates | G06Q 30/0203 |
| | | | 705/7.32 |
| 2011/0182418 A1 | 7/2011 | Anisimov et al. | |

* cited by examiner

Agent Predictive Survey

Questions sent to the customer: | Predict the customer's response:

How likely are you to recommend FreshDoor to a friend? | Detractor | Passive | Promoter Are you satisfied with the agent who assisted you? | Yes | No Did we resolve your issue? | Yes | No Zacoustic | Submit

FIG. 3

Best Practice Suggestions

Reason for Contact: Billing

Freda Moore
Team Johnson

[Coaching]

| Freda Moore | | Group | |
|---|---|---|---|
| Volume: | 2.3% | Volume: | 22% |
| AHT: | 6:30 | AHT: | 12:55 |
| NPS: | 8.3 | NPS: | -90 |
| RSAT: | 91% | RSAT: | 53% |
| RES: | 88% | RES: | 17% |

| Start | AHT | Channel | NPS | RSAT | RES | Use Sample |
|---|---|---|---|---|---|---|
| 5/15/2019 8:28am | 6:30 | Phone | Promoter | VSAT | Yes | ○ |
| 5/16/2019 9:44am | 5:28 | Phone | Promoter | VSAT | Yes | ○ |
| 5/16/2019 2:14pm | 6:02 | Phone | Promoter | VSAT | Yes | ○ |

[Listen] [Listen] [Listen]

---

Reason for Contact: New Order

Jim Barrows
Team Smith

[Scorecard]

| Jim Barrows | | Group | |
|---|---|---|---|
| Volume: | 2.1% | Volume: | 32% |
| AHT: | 4:04 | AHT: | 10:05 |
| NPS: | 81 | NPS: | -65 |
| RSAT: | 93% | RSAT: | 32% |
| RES: | 81% | RES: | 44% |

| Start | AHT | Channel | NPS | RSAT | RES | Use Sample |
|---|---|---|---|---|---|---|
| 5/15/2019 2:14pm | 6:30 | Phone | Promoter | VSAT | Yes | ○ |
| 5/14/2019 3:08pm | 6:30 | Phone | Promoter | VSAT | Yes | ○ |
| 5/14/2019 5:15pm | 6:30 | Phone | Promoter | VSAT | Yes | ○ |

[Listen] [Listen] [Listen]

SYSTEM, METHOD, AND COMPUTER PROGRAM PRODUCT FOR CONTACT CENTER MANAGEMENT

CROSS-REFERENCE TO RELATED APPLICATIONS

This application is a continuation of and claims the priority benefit of co-pending U.S. patent application Ser. No. 16/424,003, filed May 28, 2019, now U.S. Pat. No. 10,701,207, which is a continuation of and claims the priority benefit of U.S. patent application Ser. No. 15/864,415, filed Jan. 8, 2018, now U.S. Pat. No. 10,306,064, which is a continuation of and claims the priority benefit of Ser. No. 14/487,544, filed Sep. 16, 2014, now U.S. Pat. No. 9,866,690, which is a continuation-in-part of and claims the priority benefit of U.S. patent application Ser. No. 13/409,467, filed on Mar. 1, 2012, now U.S. Pat. No. 8,838,788, the entire contents of which are incorporated herein by reference, and which also claims the priority benefit of U.S. Provisional Patent Applications No. 61/538,405, filed on Sep. 23, 2011 and No. 61/549,918, filed on Oct. 21, 2011, which are also incorporated herein by reference.

BACKGROUND OF THE INVENTION

Field of the Invention

The present invention in its disclosed embodiments is related generally to the customer relationship management (CRM) process, and more particularly to a novel system, method, and computer program product for customer contact management that includes a balanced service process for accurately measuring and maximizing first call or contact resolution (FCR) and customer satisfaction (CSAT) by aligning the company contact point's view or perception of disposition with customer view of disposition.

Statement of the Prior Art

Many market leaders build their brand strategy around customer experience (CX). It has been found that the average large company gains $0.5B in annual revenue by becoming above average in CX relative to its peers. While organizations set strategy around CX, their actions still focus on compliance and "check-the-box" activities. And, according to Ryan Smith and Luke Williams in "The Most Common Reasons Customer Experience Programs Fail," Harvard Business Review (Dec. 28, 2016): "Due to lack of agent embracement, an alarming 70 percent of all FCR and Customer Experience initiatives fail to result in changes that customers notice."

It is a fact that customer surveys are the purest measure of customer experience. It is also a fact that customer surveys are the key to coaching agents and aligning contact points to improve CX. However, it is further a fact that on average, 85% of customers don't respond to surveys. Moreover, on average, only 25% of survey respondents are dissatisfied. The resulting problem is that out of 100 survey solicitations, only about three are useful for coaching.

One approach to solving this problem is to provide customer engagement centers (CEC), which are comprehensive systems for multi-channel customer service and support. This type of office and system assists businesses in making sure that customer interactions are consistent and effective. One thing that a CEC might do is to gather information from different portals or channels, including various social media platforms, and provide protocols for dealing with customers on the phone or in digital environments.

IT professionals design sets of business process technologies to figure out how best to interact with customers in any given situation. These systems are often built on top of simple call center operations to help guide each individual worker's interactions with customers. For example, with better current information about the customer, company contacts can say the right things and generally satisfy the customer's needs, while appearing more intelligent about the customer's relationship with the business. Many CECs offer features like real-time analytics; mobile-enabled platforms; peer-to-peer support; and integration with company telephony.

Because customer service is so critically important to businesses, a CEC can be a good investment in making sure that things are done right every time a company interacts with their customer, no matter how these interactions take place.

While these approaches can certainly reduce costs, they also can reduce customer satisfaction and loyalty. A better way to approach the issue is to put more focus on taking care of the customer's issue during the first contact. Improving first call or contact resolution (FCR) not only impacts the cost of operations, but also simultaneously affects customer satisfaction and retention. By improving FCR and reducing the total volume of repeat calls, companies can significantly lower service time and the overall cost to serve the customer. From a customer's perspective, improved FCR translates directly to higher satisfaction which further impacts the bottom line by boosting customer loyalty and revenues. As a matter of fact, having the issue resolved on the first contact has been cited in many studies as being the number one driver of customer satisfaction.

The pursuit of increasing FCR rates is the idealistic goal of any organization reliant upon contact center support. However, mountains of data, armies of analysts and management's ever-changing reaction to FCR crises often leave both customer management staff and company leadership apathetic and unable to serve the customer. This leaves customers frustrated and often drives them away. At the core of the problem is an insufficient or nonexistent set of tools to confront the challenge and the lack of a detailed process dedicated to rectifying the situation, as a result: (a) confusing and ever-changing processes are implemented; (b) staff morale is unfavorably impacted, decreasing tenure and increasing attrition; and (c) customers are lost.

SUMMARY OF THE INVENTION

Accordingly, it is generally an object of certain embodiments of the present invention to provide a system, method, and computer program product to accurately measure and manage first contact resolution (FCR) and customer satisfaction (CSAT) at an actionable (i.e., from agent to customer) level.

More specifically, it is an object of those and other embodiments of the present invention to generate per-call data in real-time that accurately represents the customer's perception and opinion.

The above and other objects are provided by the balanced service process described herein, which provides (a) accurate real-time, intraday, and historical FCR and CSAT statistics; (b) dynamic reporting of issues driving call volume and customer experience; (c) analysis of contacts that were not resolved; and (d) a closed loop channel to define, report and correct trending issues that impede FCR and CSAT.

Through the implementation of the balanced service process, the system, method, and computer program product according to embodiments of the present invention will demonstrate, with empirical data, the following benefits: (a) lower operating expense; (b) reduced service-related contacts; and (c) improved customer satisfaction.

Further objects, advantages, and novel features of the embodiments of the present invention and the structure and operation thereof, are described in detail below with reference to the accompanying drawings, wherein:

BRIEF DESCRIPTION OF THE DRAWINGS

FIG. 3 depicts a more detailed view of an agent predictive survey 1006 shown in FIG. 2;

FIG. 7 depicts a dashboard for best practice suggestions according to a best practice push according to an embodiment of the present invention;

FIG. 8 depicts a dashboard for best practice definitions according to a best practice push according to an embodiment of the present invention;

DETAILED DESCRIPTION OF THE EMBODIMENTS

Figure 1:
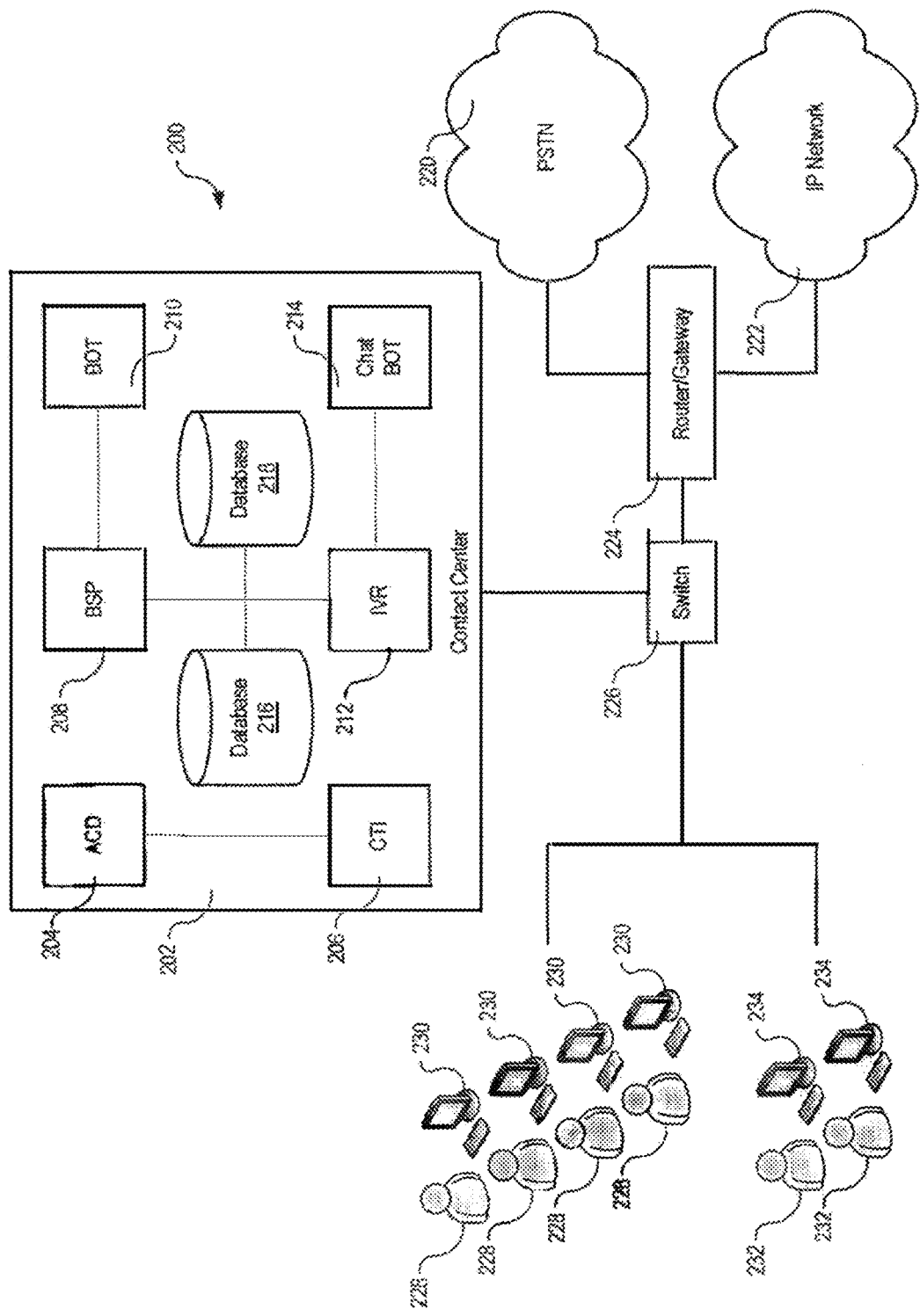
FIG. 1 depicts a high-level block diagram of a system for customer relationship management according to embodiments of the present invention.

Exemplary embodiments are discussed in detail below. While specific exemplary embodiments are discussed, it should be understood that this is done for illustration purposes only. In describing and illustrating the exemplary embodiments, specific terminology and contact types are employed for the sake of clarity. However, the embodiments are not intended to be limited to the specific terminology and contact types so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatuses and/or contact types for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; and others.

In the following description and claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may further include apparatuses and/or manual systems for performing the operations described herein. An apparatus or system may be specially constructed for the desired purposes, or it may comprise a general-purpose device selectively activated or reconfigured by a program stored in the device.

Referring now to the drawings, wherein like reference numerals and characters represent like or corresponding parts and steps throughout each of the many views, there is shown in FIG. 1 of U.S. Pat. No. 10,701,207, incorporated herein by reference above, the exception rate versus resolution rate challenge faced by the business service process according to embodiments of the present invention.

The balanced service process (BSP) according to embodiments of the present invention generates FCR, CSAT and cause codes—issues that are driving call volume data, all in actionable or real-time. The data, when analyzed, creates action plans to address process, behavioral, and recurrent training problems and also serves as the basis for an agent's reward and recognition program.

FCR as used herein can refer to first call resolution or first contact resolution, because a contact within the embodiments of the present invention may refer to any one or more of the following: face-to-face interactions, voice calls, SMS messages, email, chat, or social media communications from customers.

Systems according to embodiments of the present invention may generate FCR, CSAT and Response Codes—issues that are driving call volume data, all in actionable or real-time. The data, when analyzed, creates action plans to address process, behavioral, and recurrent training problems and also serves as the basis for an agent's reward and recognition program.

FCR is inarguably the most important metric in the contact center environment, simultaneously driving and addressing customer satisfaction, quality and efficiency. Response Codes allow for tactical intraday, and strategic long-term, management of the top issues driving customer contacts. It should be noted at this juncture that "Response Codes" may also be referred to herein as cause drivers, interaction drivers, or key performance indicators.

Fundamentally, the BSP relies on "customer contact points" (contact center agents, BOTs, etc.) to generate FCR and CSAT data. At the end of every contact the customer contact point must disposition each contact before another is presented: "YES" if the issue was resolved and "NO" if the issue was not resolved. Low "exception rates" (i.e., where there are different Agent and customer dispositions for the same record) and high "resolution rates" (i.e., where the Agent and customer both disposition the record as "YES") is the goal. Low exception rates and low resolution rates suggest training is required. High exception rates and low resolution rates indicate a process or policy breakdown, and high exception rates with high resolution rates suggest Agent behavior issues.

The accuracy of the BSP can be measured by the level of alignment with the customers' perception of resolution and satisfaction. If the customer and the Agent are in synchronicity with regard to the perception of both, and assuming all policies were adhered to, the contact may be declared resolved and accurately measured with great confidence. Conversely, when there is a divergence in the perception of resolution between the Agent and customer, there are valuable process, training, and Agent behavior management opportunities. When the process is applied, resolution and CSAT barriers quickly emerge, and targeted actions can be initiated.

Portions of some processes similar to the BSP may have been deployed in other contact centers. However, without deployment of the processes present in the BSP, the reliability of data and the ability to consistently execute an FCR and CSAT strategy is not possible. Short-term FCR and CSAT "campaigns" often reduce frontline employees to apathy and fear and create ongoing client stress. Survey results can "indicate" opportunities for improvement but are of little value over the long run unless they are integrated at the operational level and used for ongoing management of the business. BSP makes FCR and CSAT an intraday-managed metric, analogous to service level or handle time. Moreover, there is human behavior at play. When an Agent knows that he/she must accurately disposition each record before proceeding to the next contact, and will be evaluated primarily on the outcome, a culture of resolution is institutionalized enterprise wide. Without the BSP concerns related to accuracy and a built-in bias at the Agent level are justified; however, the BSP ties each Agent and customer's dispositions together via a simple survey, asking the same two questions: "Was the issue resolved?" "Was the customer satisfied with the service?" This counterbalance allows patterns in synchronicity between the Agent and the customer's perception to emerge, and actions to be created to address the gaps.

Obviously, customers are more concerned with issue resolution than contact resolution. The contact is just the means to the end, in the customer's perception. Recognizing this, the customer IVR survey strategy that the system, method, and computer program product executes is sensitized to the type of issue that was reported. For example, if the contact was a billing concern, the customer may be surveyed after they have received the next bill to determine FCR rather than immediately, post-contact. In this example, the customer may think their issue has been resolved but doesn't really know for sure until the correction is observed on the next bill. In an environment where the Agent has the tools to resolve the issues upon first contact, post-contact surveys are deployed. Either way, milestones must be decided upon and used if necessary, as triggers for customer surveys to ensure the accuracy of data.

Analytics may also be used to generate an automated Response Code. Such analytics may comprise voice analytics or video analytics, which produce an automated cause or response code for each contact and presents them in real-time and historically. These cause or response codes may itemize the combination of agent and customer survey responses and may culminate in performance management software known as Zacoustic™ (an application monitor and network performance monitoring and management tool), and they are presented in descending order within a real-time dashboard. Material increases in individual cause or response codes generate an alert, informing management that a particular "on-the-rise" issue may be of concern and may require intervention, lest FCR rates are impeded.

Zacoustic may also generate exceptions (which are defined as variances in responses between the Agent and the customer), which are then reviewed by a Quality Assurance (QA) team. With 100% contact recording, the QA analyst/ supervisor reviews contacts and makes the determination as to whether exceptions are rooted in process, skill or behavior. As trends develop, targeted action plans are created and executed upon.

As processes are progressively fixed and training and behavior issues are addressed, FCR and satisfaction rates increase. Measures to ensure Agent performance is consistently at or above standard are applied as individual Agents work through learning curves or remediation.

Referring now to FIG. 1, there is shown a high-level block diagram of a system 200 for customer relationship management according to embodiments of the present invention. System 200 generally comprises a contact center (which may comprise, e.g., single or multiple locations and/or work at home in the form of a call center or a customer engagement center) 202, which may include an Automatic Call Distributor (ACD) 204, Computer Telephony Integration (CTI) hardware/software 206, the Balanced Service Processor (Zacoustic) 208, Interactive Voice Response (IVR) hardware/software 212, and a database 216. IVR 212 may further comprise a chat BOT 214, while Zacoustic 208 may be coupled to a BOT (AI) 210 and a database 218.

As is known, ACD 204 may suitably comprise a device or system that distributes incoming calls to a specific group of terminals that agents (i.e., Agents 210, 214, 228 or supervisors/monitors 232) use. It is often part of a CTI system. Routing incoming calls is the task of the ACD 204. ACD systems are often found in offices that handle large volumes of incoming phone calls from callers who have no need to talk to a specific person but who require assistance from any of multiple persons (e.g., customer service representatives) at the earliest opportunity. The system consists of hardware for the terminals and switches, phone lines, and software for the routing strategy. The routing strategy is a rule-based set of instructions that tells the ACD 204 how calls are handled inside the system. Typically, this is an algorithm that determines the best available employee or employees to respond to a given incoming call. To help make this match, additional data may be solicited and reviewed to find out why the customer is calling. Sometimes the caller's caller ID or ANI, or the dialed number (DNIS) may be used. More often, a simple interactive voice response such as may be used with IVR 212 is used to ascertain the reason for the call.

Alternatively, ACD 204 may suitably comprise an Internet call management device of the types described in U.S. Pat. No. 8,005,024, entitled "Method For Establishing An IP Videoconference Using A Telephone Network For Voice Transmission," U.S. Pat. No. 6,819,667, entitled PSTN-Internet Notification Services," and U.S. Pat. No. 6,404,860, entitled "System And Method For Internet Call Management With Text-To-Speech Messaging," each of which is incorporated herein by reference.

CTI 206 may be used for other functions such as screen pops; call information display (ANI/DNIS); dialing (e.g., power dial, preview dial, and predictive dial; phone control in general and more particularly call control and feature control; transfers; advanced call reporting functions, etc.).

System 200 is connected to receive calls from a PSTN 235 and IP network 230. As is known, the PSTN 235 is the network of the world's public circuit-switched telephone networks, in much the same way that the Internet is the network of the world's public IP-based packet-switched networks (conceptually shown in FIG. 1 as IP network 240). Originally a network of fixed-line analog telephone systems, the PSTN 235 is now almost entirely digital, and now includes mobile as well as fixed telephones. It is sometimes referred to as the Plain Old Telephone Service (POTS).

Phones used to access the system 200 may be conventional wireline phones, wireless phones, IP phones, satellite phones, and the like. As is known, use of the phones by users may provide certain telecommunications features such as Automatic Number Identification (ANI) and Dialed Number Identification Service (DNIS). ANI provides the phone call recipient with the caller's phone number. The technology and method used to provide this information is determined by the service provider, and is often provided by sending DTMF (i.e., digital tone multi frequency) tones along with the call.

Also known as Automated Number Identification or Calling Line Identification (CLI), ANI may arrive over the D channel of an ISDN PRI circuit (out-of-band signaling), or before the first ring on a single line (inband signaling). Caller ID is the local phone company version of ANI, and is usually delivered inband.

In contact center applications, ANI displays the number of the caller to the phone representative or resolver in real-time. Among other things, the contact center can use the information to process the call based upon prior history or can forward the call to a different department or organization.

DNIS is a service sold by telecommunications companies to corporate clients that lets them determine which telephone number was dialed by a customer. This is useful in determining how to answer an inbound call. The telecommunications company sends a DNIS number to the client phone system during the call setup. The DNIS number is typically 4 to 10 digits in length.

For example, a company may have a different toll-free number for each product line it sells. If a contact center is handling calls for multiple product lines, the switch that receives the call can examine the DNIS, and then play the appropriate recorded greeting. Another example of multiple toll free numbers might be used for multi-lingual identification. A dedicated toll-free number might be set up for Spanish speaking customers.

With IVR (i.e., interactive voice response) systems, DNIS may be used as routing information for dispatching purposes, to determine which script or service should be played based on the number that was dialed to reach the IVR platform. For example, 0906 123 4567 and 0906 123 4568 may well both connect to the same IVR system, but one number may be required to provide a competition service and the other might be an information line. The DNIS is what distinguishes these lines from each other and hence the IVR will know which service to provide to the caller.

A phone call, chat, or email comes into the contact center 205 through the PSTN 235 or IP network 240. It is processed through a router/gateway 245 and switch 250 to the contact center 205. The contact center 205, in turn, decides which agent/resolver 255 gets the contact and performs the balanced service process (BSP) according to embodiments of the present invention described herein.

Zacoustic 208 may consist of the following successive components. Data Generation is the first step, in which the Agent disposition of contact (RDP), customer disposition of contact (CDP), and FCR calculation are determined. A cause or response code may be manually determined or automatically generated by use of voice or video analytics. Quality Assurance (QA) is then used to determine exceptions, and monitoring/call review. The exceptions may then be analyzed.

As defined above, the steps of Zacoustic 208 may include an "action plan," which sets forth the actions stemming from trends in exception analysis related to (a) process; (b) training; and (c) behavior. An "application cause" is the primary reason the customer contacted the contact center 205 as displaced in the client's application. "Behavior Reconditioning" may comprise the actions stemming from data that illuminates resolver behavior (e.g., deliberate miscoding of dispositions) that requires some or all of; coaching, counseling, termination, and when completed, increases data accuracy and FCR rates.

Resolved rate or "Billable Resolution Rate" comprises a metric that can be used to account for cost of bill the client for resolved contacts only. It may be calculated as follows: TOTAL "YES" RDP+TOTAL "OUT OF CONTROL" RDPs (as determined by QA).

A "contact" may comprise the act of a customer contacting the contact center 205 (i.e., phone, chat, e-mail). Alternatively, a "contact" may comprise customer queries via social media. The ability to effectively deal with such customer queries requires companies to have in place some form of system to monitor what is being said about the company across various social media channels, including blogs, Twitter and LinkedIn. Dozens of such services exist to help, feeding companies all sorts of information on what is being said about them, based on whatever key words they select.

A growing number of companies are now trying to manage those transactions, so they come into a contact center queue just like a phone call does. Zacoustic 208 may also queue such interactions, deliver them to appropriately skilled agents/Agents 228, BOTs 210 and Chat BOTs 214 and monitor the response and report on the outcomes. Zacoustic 208 may even keep track of which contact point handles each interaction, in case any follow-up is required.

A "Cause of Contact" may comprise the primary reason for the customer contacting the contact center 202. It may be derived and digitally converted to a cause or response code (collectively referred to as "Response Code") and sent to Zacoustic (a customer experience management system for contact centers available from Balances, Inc. of Austin, Tex. USA) via voice or video analytics.

A "Response Code" may comprise the coding that resides in Zacoustic related to the Cause of Contact that may be digitally derived via Voice Analytics.

A "CDP" (or Customer Disposition) may comprise the record of the customer's response to the IVR survey (e.g., "Was the issue resolved?"). The QA (or Quality Assurance) team analyzes exceptions and determines root cause, broken into three major components, (a) process; (b) training; and (c) behavior. Data may comprise the total numbers of "YES" and "NO" dispositions, which are generated by resolvers and customers and is used for operations, decision-making and planning.

A "Disposition" may comprise responses to surveys which ask Agents and customers "Was the issue resolved?" It is mandatory that the Agent responds at the end of each contact, via Zacoustic. The customers are given the option of post call—and post any milestones—via IVR survey. Responses are either "YES" (i.e., the issue was resolved/customer was satisfied) or "NO" (i.e., the issue was not resolved/customer was not satisfied). Responses become data. An "Exception" may comprise a different disposition/response for the same record(s) as dispositioned by the Agent and the customer.

An "Exception Analysis" may comprise the determination made by QA regarding the root cause of the Exception. Among such root causes are: (a) client process; (b) CRM process; (c) Agent training; and (d) Agent behavior. The "Exception Rate" may comprise the percentage of variances in responses between the customer and the Agent (calculated as TOTAL EXCEPTIONS/TOTAL CDP's).

"Milestones" may comprise the events that trigger the initiation of customer surveys (e.g., billing dates, return dates, etc.). Surveys must be tied to milestones to ensure that the customer's perception of resolution is accurate.

"Process Reconditioning" may comprise actions stemming from data that illuminates a process, either on behalf of the BPO or client that requires repair and when completed, should increase FCR.

"Recurrent Training" may comprise actions stemming from data that illuminates a need for refresher training for one, some or all resolvers who support a certain product, service, or process, when completed, should increase FCR.

"Resolution Rate" may comprise the percentage of contacts that the provider resolves calculated as (RDP "YES"/TOTAL CALLS HANDLED).

Zacoustic (i.e., the performance management software which powers the balanced service process) supports and runs on BSP 208, and displays key performance metrics in real-time, including—and most importantly—FCR statistics and CSAT. Zacoustic resides on every Agent's, supervisor's, and client's desktop 230, 234, providing the necessary feedback required optimizing intraday FCR performance Its primary function is to calculate customer satisfaction and call resolution metrics, with various associations to those metrics, into certain formats and reports.

According to one embodiment of the present invention, such performance management software is a cloud-based program developed in Java, with HTML providing an easily navigable graphical user interface. It was developed to provide open access from any platform running most available browsers, including the following, or newer, browser releases: Google Chrome 24.0.1312.56; Firefox 18.0; Microsoft Internet Explorer 9.0; and Safari 6.0. MySQL may be used to power the performance management software in database 230. It may be built on a scalable, load-balance robust platform (e.g., GlassFish 3.0 servers) of the type that is deployable through the cloud worldwide.

At the end of each contact, the Agent is presented with a number of question(s), such as those shown in FIG. 3. The Agent must then an appropriate, and the response is sent to the Zacoustic database 218 where it will await CDP or QA analysis.

The FCR Rate and CSAT rate are immediately populated in the Zacoustic database 218 along with the number of contacts the agent/enterprise has handled within the same time period. Contacts handled data is generated from the ACD 204. The FCR rate for individual Agents, supervisors, operations managers, accounts, clients and enterprise is then generated. The calculation for FCR rate is as follows: TOTAL "YES" RDP/TOTAL CONTACTS HANDLED. The point in time in which a customer commitment has been accomplished, should be inserted into the IVR decision tree and triggered at the appropriate time, if required.

An IVR contact is generated to the customer, post any milestone requirements, and the customer is asked by the IVR, "You recently contacted [CLIENT] for [RESPONSE CODE], was this issue resolved? Press 1 for "YES" and 2 for "NO" and "Were you satisfied with the service provided by _____" Press 1 for "YES" and 2 for "NO". IP network contacts are handled the same and made over the appropriate media.

The Exception Rate may be calculated as the total number of Exceptions divided by the total number of CDP's—the Exception Rate percentage is then multiplied by the Resolution Rate and subtracted from the Resolution Rate to give the billable Resolution Rate.

Voice and/or video analytics may be used to determine whether key words and phrases are identified and used to produce "Response Codes", the main reason why a customer contacted the BPO/contact center 205. Once generated, Cause Codes are sent to TruView where they are stack ranked and presented on the main dashboard in descending order.

Changes in contact patterns can be quickly identified and immediately addressed through the presentation of Cause Codes in Zacoustic. If trends change dramatically, an alert is sent to the BPO/contact center 202 and the client's management and the Response Code that is spiking can be examined through live monitoring. Additionally, FCR Rates for the Response Code in question may be produced and if the FCR Rate is low for the Response Code in question. A material process or training issue is quickly identified and can be addressed swiftly, thereby preserving FCR Rates.

When the Agent and the customer generate different dispositions for the same contact, it is defined as an Exception. An Exception report, which consists of: (a) the RDP; (b) CDP; and (c) contact recording may be bundled and presented to the QA team. QA analysts review every exception to determine the root cause of the Exception. The three categories of Exception root cause are process, training and behavior. The following are examples for each:

Example 1

Process: Assume that a customer contacted the BPO/contact center 205 to have an erroneous charge removed from their bill. The Agent follows procedure and orders the charge removed and dispositions the contact as "YES". Due to an internal process error at the client, the charge is not removed and when the customer is contacted, the CDP returns as "NO". This creates an Exception and is routed to QA for further review. The QA analyst determines that this is a process error on the client's side and confirms the Agent followed procedure. As trends develop, it is established that 12% of all contacts are related to this same Response Code. This information is relayed back to the client via a "Process Reconditioning Request". Once the process is reconditioned, the FCR rate is favorably impacted for 12% of all contacts.

Example 2

Training: The client releases a new product and prior to release, training is conducted for all Agent. The training includes instructions on how to install the product and Agents execute to plan. However, a glitch in the system occurs moments after install disabling the product and all that was required was the install of a driver to remedy the issue. Upon completion of the contact the Agent dispositions the record as "YES" and when surveyed the customer disposition is "NO". This creates an Exception and is routed to QA for further review. The QA analyst coordinates with the client and determines that this is a training error on the client's side and confirms the Agent followed procedure. As trends develop it is established that 15% of all contacts are related to this same Response Code. This information is relayed back to the BPO/contact center 205 training via a "Training Reconditioning Request". Once the resolvers receive recurrent training, the FCR rate is favorably impacted for 15% of all contacts.

Example 3

Behavior: The BPO/contact center 205 may reward Agents with a high-resolution rate and an individual Agent is close to being rewarded. He is near his lunch break and he rushes a call to check out on time. He dispositions the contact as "YES" and when surveyed, the customer dispositions the contact as "NO". This creates an Exception and is routed to QA for further review. The QA analyst determines that this is a behavior error. This information is relayed back to the Agent's supervisor 232 via a "Behavior Reconditioning Request". The supervisor 232 has three hours to meet with the Agent 228, review the call and initiate counseling, which is stored progressively in the Zacoustic database 218. The Agent is now on notice and any further infractions of policy result in progressive counseling up to and including termination of employment.

Significant sampling of contacts that lack CDP data are randomly reviewed by QA and blindly—meaning the QA analyst cannot view either the RDP or CDP—and the QA analyst produces a disposition upon completion of review. If a (shadow) Exception is generated as a result of this exercise, Exception Analysis as described herein below is conducted.

Significant samples of Exceptions are reviewed and the QA analyst makes a determination as whether the root cause of the Exception was (a) a CRM or client policy/process issue, (b) a training issue, meaning the Agent obviously lacked the tools or training needed to resolve the contact, or (c) a behavior issue, meaning it appears that the resolver deliberately and wrongfully dispositioned the contact.

The following actions stem from the various combinations RDP and CDP as shown in Table 1 below.

TABLE 1

| | | Dispositions | |
| --- | --- | --- | --- |
| RDP | CDP | Likely Implication | Action Item |
| Yes | Yes | Good Performance | Reward |
| Yes | No | Agent Behavior | Coach |
| No | Yes | Process Breakdown | Client interface to address process fix |
| No | No | Training Required | Establish trends, develop and execute on training |

As Exception analyses are produced, trends are analyzed, and stack ranked in descending order. In the event that a CRM process is impeding FCR, and can be adjusted within the realm of fair practice, client approval may be sought, if required, and the process is adjusted. If Agent training is required to affect the process change, it is scheduled and executed upon as quickly as possible.

Both CRM and client process/policy reconditioning action items may be tracked from the time a need was identified to the time the process or policy is fixed. Analysis that illustrates the impact of the broken process can be produced using the following calculation: TOTAL BROKEN PROCESS CONTACTS/TOTAL CONTACTS HANDLED. The percentage of this calculation may be removed from the overall FCR rate to clearly illustrate the impact of the broken process thereby creating a crystal clear, tangible sense of urgency.

Agents who have ongoing high-Resolution Rates, coupled with low Exception Rates, may be recognized and rewarded in conjunction with an established program. Given the complexity of various scopes of work, reward and recognition programs may be developed on a program-by-program basis.

Agents who demonstrate chronically low-Resolution Rates and high Exception Rates may be placed on probationary counseling. If it is determined that the barrier for improvement is rooted in "will", rather than "skill", termination of employment should occur upon a prescribed fair HR practice.

As Exceptions statistics are analyzed using Zacoustic reporting tools, common trends in unresolved Response Codes quickly emerge. This information may be organized by: (a) frequency in Response Code; and (b) Exception Rates in descending order. The most frequent Response Codes coupled with the highest Exception Rates allows for targeted training.

The system and client should budget approximately 2 hours per Agent per week for recurrent training. This training might be for an individual Agent or a group of Agent.

As data is collected for the client, the client/system may establish a normal learning curve period for the group of Agents assigned to the account. This learning curve will allow the CRM group to identify and correct performance and behavior trends as early as possible, while giving Agents the appropriate amount of time to learn the client's business.

Cause or response codes may be four-letter acronyms that itemize the combination of agent and customer survey responses. Response codes may be used to prioritize records for evaluation and for quick interpretation among users of the Balance Process and Balance Software. In such a manner, they may categorize the combination of agent and customer survey responses while at the same time may be assigned a priority used for evaluation of the Agent Survey.

Such cause or response codes serve as a means to quickly describe agent-customer survey response alignment, the survey question responded to (i.e., either satisfaction or resolution) and whether or not the call-in question was a repeat. Response codes are generated only after the agent has responded to the Agent Survey and the customer has responded to the Customer Survey, or had the opportunity to respond and did not.

Each Response Code may be assigned a level of priority and used within an algorithm to help determine which Agent Surveys are to be evaluated by Quality Assurance. Response Codes may appear in various screens and reports inside the application, allowing users to isolate agent-customer alignment concerns. An exemplary syntax of the Response Codes according to an embodiment of the present invention is described in Tables 2 and 3 below.

TABLE 2

Response Code Letter Categories

| LETTER | 1 | 2 | 3 | 4 |
| --- | --- | --- | --- | --- |
| CATEGORY | Survey Question (Satisfaction or Resolution) | Survey Alignment | Agent Survey Response | Repeat Status |

TABLE 3

Response Code Categories

| LETTER 1 Survey Question | | LETTER 2 Survey Alignment | | LETTER 3 Agent Response | | LETTER 4 Repeat Status | |
| --- | --- | --- | --- | --- | --- | --- | --- |
| S | Satisfaction | M | Matching | Y | Yes | F | First |
| R | Resolution | X | Not Matching | N | No | Z | Repeat |
| E | Satisfaction w/Milestone | A | Agent-Only | | | | |
| O | Resolution w/Milestone | | | | | | |

In addition to the above Response Code Categories, the system may include Response Codes for instances with no Agent or Customer Survey responses, including Transfers, Dropped Contacts, Escalations, and Flagged Contacts as shown, for example, in Table 4 below. These special Response Codes may also be prioritized for QA review along with the standard codes.

TABLE 4

Flagged, Dropped and Transferred Codes

| DISPOSITION | DESCRIPTION |
| --- | --- |
| Flag Record | Agents check the "Flag Record" box when it would be inappropriate for the customer to receive a survey For example, if the customer threatened legal action When the "Flag Record" box is checked, the rest of the survey questions, except the "Was this a repeat contact?" become unavailable to the agent The "No" box for both, "Will the customer tell us they were satisfied?" and "Will the customer tell us their issue was resolved?" questions are auto-populated 100% of these records are reviewed by the Data Assurance team |
| Call Dropped | When through no fault of the agent the call is terminated the call dropped function is utilized (e.g., technical issues or the customer hangs up) The importance of ensuring a one-to-one ratio of customer contacts to Agent Survey is of critical importance to the overall integrity of the Balanced Service Process and the data it produces Once the "Submit" button is pressed, the record becomes coded as a Call Dropped 100% of Call Dropped records are reviewed by the Data Assurance team to ensure that the disconnect was legitimate |
| Call Transferred | Calls that are transferred are accounted for when the agent checks the "Call Transferred" box Once checked, all other fields in the Agent Survey are rendered unavailable The customer does not receive a survey when a call is transferred - only when the last agent who touches the customer contact completes the Agent Survey will the customer receive a survey The Data Assurance team reviews 100% of Call Transferred records to validate that the transfer was required |

Response code creation may occur when the original agent responses are either matched with a customer response or the window of opportunity for the customer response closes. the window timeframe is set by the system administrator as part of the control panel functions for the software.

Response Codes may be separated into three clusters: (1) negative, (2) neutral, and (3) positive. Such clustering of response codes provides the following benefits: grouping data; identifying trends; and an element of quality assurance evaluation algorithms Exemplary Response Code clusters according to an embodiment of the present invention are described in Table 5 below.

TABLE 5

Response Code Clusters

| CATEGORY | CLUSTERS | DESCRIPTION |
|---|---|---|
| Negative | Sat_Neg Res_Neg | Groups satisfaction or resolution Response Codes wherein either or both the agent and the customer responded "No" to the respective survey question |

TABLE 5-continued

Response Code Clusters

| CATEGORY | CLUSTERS | DESCRIPTION |
|---|---|---|
| Neutral | Sat_Neu Res_Neu | Groups satisfaction or resolution Response Codes that cannot be definitively categorized as either negative or positive |
| Positive | Sat_Pos Res_Pos | Groups satisfaction or resolution Response Codes wherein both the agent and the customer responded "Yes" to the respective survey question |

Response Codes may be defined as follows in Table 6 below.

TABLE 6

Response Codes

| CODE | SURVEY | ALIGNMENT | AGENT | CUST | REPEAT | CLUSTER |
|---|---|---|---|---|---|---|
| EANF | Satisfaction (w/Milestone) | Agent-Only | No | N/A | First | Sat_Neg |
| EANZ | Satisfaction (w/Milestone) | Agent-Only | No | N/A | Repeat | Sat_Neg |
| EAYF | Satisfaction (w/Milestone) | Agent-Only | Yes | N/A | First | Sat_Neu |
| EAYZ | Satisfaction (w/Milestone) | Agent-Only | Yes | N/A | Repeat | Sat_Neu |
| EMNF | Satisfaction (w/Milestone) | Matching | No | No | First | Sat_Neg |
| EMNZ | Satisfaction (w/Milestone) | Matching | No | No | Repeat | Sat_Neg |
| EMYF | Satisfaction (w/Milestone) | Matching | Yes | Yes | First | Sat_Pos |
| EMYZ | Satisfaction (w/Milestone) | Matching | Yes | Yes | Repeat | Sat_Pos |
| EXNF | Satisfaction (w/Milestone) | Not Matching | No | Yes | First | Sat_Neg |
| EXNZ | Satisfaction (w/Milestone) | Not Matching | No | Yes | Repeat | Sat_Neg |
| EXYF | Satisfaction (w/Milestone) | Not Matching | Yes | No | First | Sat_Neg |
| EXYZ | Satisfaction (w/Milestone) | Not Matching | Yes | No | Repeat | Sat_Neg |
| OANF | Resolution (w/Milestone) | Agent-Only | No | N/A | First | Res_Neg |
| OANZ | Resolution (w/Milestone) | Agent-Only | No | N/A | Repeat | Res_Neg |
| OAYF | Resolution (w/Milestone) | Agent-Only | Yes | N/A | First | Res_Neu |
| OAYZ | Resolution (w/Milestone) | Agent-Only | Yes | N/A | Repeat | Res_Neu |
| OMNF | Resolution (w/Milestone) | Matching | No | No | First | Res_Neg |
| OMNZ | Resolution (w/Milestone) | Matching | No | No | Repeat | Res_Neg |
| OMYF | Resolution (w/Milestone) | Matching | Yes | Yes | First | Res_Pos |
| OMYZ | Resolution (w/Milestone) | Matching | Yes | Yes | Repeat | Res_Pos |
| OXNF | Resolution (w/Milestone) | Not Matching | No | Yes | First | Res_Neg |
| OXNZ | Resolution (w/Milestone) | Not Matching | No | Yes | Repeat | Res_Neg |
| OXYF | Resolution (w/Milestone) | Not Matching | Yes | No | First | Res_Neg |
| OXYZ | Resolution (w/Milestone) | Not Matching | Yes | No | Repeat | Res_Neg |
| RANF | Resolution | Agent-Only | No | N/A | First | Res_Neg |
| RANZ | Resolution | Agent-Only | No | N/A | Repeat | Res_Neg |
| RAYF | Resolution | Agent-Only | Yes | N/A | First | Res_Neu |
| RAYZ | Resolution | Agent-Only | Yes | N/A | Repeat | Res_Neu |
| RMNF | Resolution | Matching | No | No | First | Res_Neg |
| RMNZ | Resolution | Matching | No | No | Repeat | Res_Neg |
| RMYF | Resolution | Matching | Yes | Yes | First | Res_Pos |
| RMYZ | Resolution | Matching | Yes | Yes | Repeat | Res_Pos |
| RXNF | Resolution | Not Matching | No | Yes | First | Res_Neu |
| RXNZ | Resolution | Not Matching | No | Yes | Repeat | Res_Neu |
| RXYF | Resolution | Not Matching | Yes | No | First | Res_Neg |
| RXYZ | Resolution | Not Matching | Yes | No | Repeat | Res_Neg |
| SANF | Satisfaction | Agent-Only | No | N/A | First | Sat_Neg |
| SANZ | Satisfaction | Agent-Only | No | N/A | Repeat | Sat_Neg |
| SAYF | Satisfaction | Agent-Only | Yes | N/A | First | Sat_Neu |
| SAYZ | Satisfaction | Agent-Only | Yes | N/A | Repeat | Sat_Neu |
| SMNF | Satisfaction | Matching | No | No | First | Sat_Neg |
| SMNZ | Satisfaction | Matching | No | No | Repeat | Sat_Neg |
| SMYF | Satisfaction | Matching | Yes | Yes | First | Sat_Pos |
| SMYZ | Satisfaction | Matching | Yes | Yes | Repeat | Sat_Pos |
| SXNF | Satisfaction | Not Matching | No | Yes | First | Sat_Neu |
| SXNZ | Satisfaction | Not Matching | No | Yes | Repeat | Sat_Neu |
| SXYF | Satisfaction | Not Matching | Yes | No | First | Sat_Neg |
| SXYZ | Satisfaction | Not Matching | Yes | No | Repeat | Sat_Neg |
| FXFX | None | Flagged Contact | N/A | N/A | N/A | N/A |
| DXDX | None | Dropped Contact | N/A | N/A | N/A | N/A |
| TXTA | None | Escalation | N/A | N/A | N/A | N/A |
| TXTD | None | Transfer | N/A | N/A | N/A | N/A |

Each Response Code may be assigned a priority indicating the level of likelihood that error in agent inference of customer perception has occurred. These priorities become part of an algorithm used by the performance management software to present records for evaluation by the Quality Assurance team. Table 7 below sets forth an exemplary list of priorities.

TABLE 7

Response Code Priorities

| PR | CODE | SURVEY | ALIGNMENT | AGENT | CUST | REPEAT | CLUSTER |
|---|---|---|---|---|---|---|---|
| 1 | EXYZ | Satisfaction (w/Milestone) | Not Matching | Yes | No | Repeat | Sat_Neg |
| 2 | EXYF | Satisfaction (w/Milestone) | Not Matching | Yes | No | First | Sat_Neg |
| 3 | EMNZ | Satisfaction (w/Milestone) | Matching | No | No | Repeat | Sat_Neg |
| 4 | EMNF | Satisfaction (w/Milestone) | Matching | No | No | First | Sat_Neg |
| 5 | EANZ | Satisfaction (w/Milestone) | Agent-Only | No | N/A | Repeat | Sat_Neg |
| 6 | EANF | Satisfaction (w/Milestone) | Agent-Only | No | N/A | First | Sat_Neg |
| 7 | EXNZ | Satisfaction (w/Milestone) | Not Matching | No | Yes | Repeat | Sat_Neg |
| 8 | EXNF | Satisfaction (w/Milestone) | Not Matching | No | Yes | First | Sat_Neg |
| 9 | OXYZ | Resolution (w/Milestone) | Not Matching | Yes | No | Repeat | Res_Neg |
| 10 | OXYF | Resolution (w/Milestone) | Not Matching | Yes | No | First | Res_Neg |
| 11 | OMNZ | Resolution (w/Milestone) | Matching | No | No | Repeat | Res_Neg |
| 12 | OMNF | Resolution (w/Milestone) | Matching | No | No | First | Res_Neg |
| 13 | OANZ | Resolution (w/Milestone) | Agent-Only | No | N/A | Repeat | Res_Neg |
| 14 | OANF | Resolution (w/Milestone) | Agent-Only | No | N/A | First | Res_Neg |
| 15 | OXNZ | Resolution (w/Milestone) | Not Matching | No | Yes | Repeat | Res_Neg |
| 16 | OXNF | Resolution (w/Milestone) | Not Matching | No | Yes | First | Res_Neg |
| 17 | RXYZ | Resolution | Not Matching | Yes | No | Repeat | Res_Neg |
| 18 | SXYZ | Satisfaction | Not Matching | Yes | No | Repeat | Sat_Neg |
| 19 | RXYF | Resolution | Not Matching | Yes | No | First | Res_Neg |
| 20 | SXYF | Satisfaction | Not Matching | Yes | No | First | Sat_Neg |
| 21 | RMNZ | Resolution | Matching | No | No | Repeat | Res_Neg |
| 22 | SMNZ | Satisfaction | Matching | No | No | Repeat | Sat_Neg |
| 23 | RMNF | Resolution | Matching | No | No | First | Res_Neg |
| 24 | SMNF | Satisfaction | Matching | No | No | First | Sat_Neg |
| 25 | RANZ | Resolution | Agent-Only | No | N/A | Repeat | Res_Neg |
| 26 | SANZ | Satisfaction | Agent-Only | No | N/A | Repeat | Sat_Neg |
| 27 | RANF | Resolution | Agent-Only | No | N/A | First | Res_Neg |
| 28 | SANF | Satisfaction | Agent-Only | No | N/A | First | Sat_Neg |
| 29 | EAYZ | Satisfaction (w/Milestone) | Agent-Only | Yes | N/A | Repeat | Sat_Neu |
| 30 | EAYF | Satisfaction (w/Milestone) | Agent-Only | Yes | N/A | First | Sat_Neu |
| 31 | OAYZ | Resolution (w/Milestone) | Agent-Only | Yes | N/A | Repeat | Res_Neu |
| 32 | OAYF | Resolution (w/Milestone) | Agent-Only | Yes | N/A | First | Res_Neu |
| 33 | RXNZ | Resolution | Not Matching | No | Yes | Repeat | Res_Neu |
| 34 | SXNZ | Satisfaction | Not Matching | No | Yes | Repeat | Sat_Neu |
| 35 | RXNF | Resolution | Not Matching | No | Yes | First | Res_Neu |
| 36 | SXNF | Satisfaction | Not Matching | No | Yes | First | Sat_Neu |
| 37 | RAYZ | Resolution | Agent-Only | Yes | N/A | Repeat | Res_Neu |
| 38 | SAYZ | Satisfaction | Agent-Only | Yes | N/A | Repeat | Sat_Neu |
| 39 | RAYF | Resolution | Agent-Only | Yes | N/A | First | Res_Neu |
| 40 | SAYF | Satisfaction | Agent-Only | Yes | N/A | First | Sat_Neu |
| 41 | OMYZ | Resolution (w/Milestone) | Matching | Yes | Yes | Repeat | Res_Pos |
| 42 | OMYF | Resolution (w/Milestone) | Matching | Yes | Yes | First | Res_Pos |
| 43 | EMYZ | Satisfaction (w/Milestone) | Matching | Yes | Yes | Repeat | Sat_Pos |
| 44 | EMYF | Satisfaction (w/Milestone) | Matching | Yes | Yes | First | Sat_Pos |
| 45 | RMYZ | Resolution | Matching | Yes | Yes | Repeat | Res_Pos |
| 46 | RMYF | Resolution | Matching | Yes | Yes | First | Res_Pos |
| 47 | SMYZ | Satisfaction | Matching | Yes | Yes | Repeat | Sat_Pos |
| 48 | SMYF | Satisfaction | Matching | Yes | Yes | First | Sat_Pos |

Response Codes may be used for two primary purposes. The first purpose is to prioritize the various combinations of agent-customer survey responses for review. Those that are incongruent and involve repeat calls are higher priority, while those that are congruent with both parties responding favorably are lower priority. The second purpose is for ease in communication in various screens and reports of the performance management software. The purpose and usage of such response codes are set forth in Table 8 below.

TABLE 8

Response Code Usage

| PURPOSE | USAGE |
|---|---|
| Prioritization | Response Codes indicate congruency between agent-customer survey responses, the survey question responded to and the whether or not the call was a repeat for the same concern. Calls that are assigned a higher priority are more likely to be evaluated by the Quality Assurance team. The guidelines for establishing priorities are:<br>If the agent indicates that a customer was satisfied and that their issue was resolved, and the customer indicates the opposite, and it is a repeat call, the chances of identifying an error and creating a rich coaching opportunity are very high<br>If both the agent and customer respond favorably to the satisfaction and/or resolution survey questions, chances are high that everything was done correctly. However, these records are reviewed to ensure that the agent adhered to policy |
| Evaluation Screen | Response Codes appear in the top panel of the evaluation screen so that the QA Analyst is aware of the condition of survey responses |
| Task Screen | When conducting coaching and counseling sessions with the agent, the Task screen displays the Response Code for the record being reviewed. This allows the agent and the supervisor to better understand the purpose of the coaching or counseling session. |
| Reporting | Various reports generated illustrate Response Codes for the primary purpose of identifying trends |

As noted above, Response Codes are generated after the agent completes the Agent Survey and after the customer either completes the Customer Survey or has had the opportunity to complete the Customer Survey but did not. Agent Surveys may be presented to Quality Assurance for evaluation in order of priority assigned to each Response Code. A more detailed description in order of priority, and the prime indicators associated with each Response Code is set forth in Table 9 below. It should be noted, however, that "prime indicators" are not inclusive of every potential root cause. Rather, they may be used as a guideline related to the generation of a Response Code.

TABLE 9

Response Codes Priority Detailed Description

| | CODE | DESCRIPTION | PRIME INDICATORS |
|---|---|---|---|
| 1 | EXYZ | Survey Question: Satisfaction<br>Milestone: Present<br>Alignment: Not Matching<br>Agent Response: Yes<br>Repeat Status: Repeat | An opportunity exists to coach the agent with regard to engagement and etiquette<br>The customer was not satisfied due to an existing policy or process<br>Potential concerns with the method of resolution utilized by the agent |
| 2 | EXYF | Survey Question: Satisfaction<br>Milestone: Present<br>Alignment: Not Matching<br>Agent Response: Yes<br>Repeat Status: First | An opportunity exists to coach the agent with regard to engagement and etiquette<br>The customer was not satisfied due to an existing policy or process<br>Potential concerns with the method of resolution utilized by the agent |
| 3 | EMNZ | Survey Question: Satisfaction<br>Milestone: Present<br>Alignment: Matching<br>Agent Response: No<br>Repeat Status: Repeat | The customer was not satisfied due to an existing policy or process<br>The agent is requesting help related to call handling |
| 4 | EMNF | Survey Question: Satisfaction<br>Milestone: Present<br>Alignment: Matching<br>Agent Response: No<br>Repeat Status: First | The customer was not satisfied due to an existing policy or process<br>The agent is requesting help related to call handling |
| 5 | EANZ | Survey Question: Satisfaction<br>Milestone: Present<br>Alignment: Agent-Only<br>Agent Response: No<br>Repeat Status: Repeat | The agent is serving as a reliable proxy for the customer<br>The customer was not satisfied due to an existing policy or process<br>The agent is asking for help related to call handling |
| 6 | EANF | Survey Question: Satisfaction<br>Milestone: Present<br>Alignment: Agent-Only<br>Agent Response: No<br>Repeat Status: First | The agent is serving as a reliable proxy for the customer<br>The customer was not satisfied due to an existing policy or process<br>The agent is asking for help related to call handling |
| 7 | EXNZ | Survey Question: Satisfaction<br>Milestone: Present<br>Alignment: Not Matching<br>Agent Response: No<br>Repeat Status: Repeat | Agent error in inference of customer perception<br>The agent is asking for help related to call handling |

TABLE 9-continued

Response Codes Priority Detailed Description

| | CODE | DESCRIPTION | PRIME INDICATORS |
|---|---|---|---|
| 8 | EXNF | Survey Question: Satisfaction<br>Milestone: Present<br>Alignment: Not Matching<br>Agent Response: No<br>Repeat Status: First | Agent error in inference of customer perception<br>The agent is asking for help related to call handling |
| 9 | OXYZ | Survey Question: Resolution<br>Milestone: Present<br>Alignment: Not Matching<br>Agent Response: Yes<br>Repeat Status: Repeat | Concern with the method of resolution utilized by an individual agent<br>Training concern affecting multiple agents<br>Problem with fulfillment (etc.) which occurred outside the control of the support organization |
| 10 | OXYF | Survey Question: Resolution<br>Milestone: Present<br>Alignment: Not Matching<br>Agent Response: Yes<br>Repeat Status: First | Concern with the method of resolution utilized by an individual agent<br>Training concern affecting multiple agents<br>Problem with fulfillment (etc.) which occurred outside the control of the support organization |
| 11 | OMNZ | Survey Question: Resolution<br>Milestone: Present<br>Alignment: Matching<br>Agent Response: No<br>Repeat Status: Repeat | Potential concern with existing policy or process<br>Training concern affecting an individual agent or group of agents |
| 12 | OMNF | Survey Question: Resolution<br>Milestone: Present<br>Alignment: Matching<br>Agent Response: No<br>Repeat Status: First | Potential concern with existing policy or process<br>Training concern affecting an individual agent or group of agents |
| 13 | OANZ | Survey Question: Resolution<br>Milestone: Present<br>Alignment: Agent-Only<br>Agent Response: No<br>Repeat Status: Repeat | Agent error in inference of customer perception<br>Potential concern with existing policy or process<br>Training concern affecting an individual agent or group of agents |
| 14 | OANF | Survey Question: Resolution<br>Milestone: Present<br>Alignment: Agent-Only<br>Agent Response: No<br>Repeat Status: First | Agent error in inference of customer perception<br>Potential concern with existing policy or process<br>Training concern affecting an individual agent or group of agents |
| 15 | OXNZ | Survey Question: Resolution<br>Milestone: Present<br>Alignment: Not Matching<br>Agent Response: No<br>Repeat Status: Repeat | Agent error in inference of customer perception |
| 16 | OXNF | Survey Question: Resolution<br>Milestone: Present<br>Alignment: Not Matching<br>Agent Response: No<br>Repeat Status: First | Agent error in inference of customer perception |
| 17 | RXYZ | Survey Question: Resolution<br>Milestone: Not Present<br>Alignment: Not Matching<br>Agent Response: Yes<br>Repeat Status: Repeat | Concern with the method of resolution utilized by an individual agent<br>Training concern affecting multiple agents |
| 18 | SXYZ | Survey Question: Satisfaction<br>Milestone: Not Present<br>Alignment: Not Matching<br>Agent Response: Yes<br>Repeat Status: Repeat | An opportunity exists to coach the agent with regard to engagement and etiquette<br>The customer was not satisfied due to an existing policy or process |
| 19 | RXYF | Survey Question: Resolution<br>Milestone: Not Present<br>Alignment: Not Matching<br>Agent Response: Yes<br>Repeat Status: First | Concern with the method of resolution utilized by an individual agent<br>Training concern affecting multiple agents |
| 20 | SXYF | Survey Question: Satisfaction<br>Milestone: Not Present<br>Alignment: Not Matching<br>Agent Response: Yes | An opportunity exists to coach the agent with regard to engagement and etiquette<br>The customer was not satisfied due to an existing policy or process |
| 21 | RMNZ | Survey Question: Resolution<br>Milestone: Not Present<br>Alignment: Matching<br>Agent Response: No<br>Repeat Status: Repeat | Potential concern with existing policy or process<br>Training concern affecting an individual agent or group of agents |

TABLE 9-continued

Response Codes Priority Detailed Description

| CODE | DESCRIPTION | PRIME INDICATORS |
|---|---|---|
| 22 SMNZ | Survey Question: Satisfaction<br>Milestone: Not Present<br>Alignment: Matching<br>Agent Response: No<br>Repeat Status: Repeat | An opportunity exists to coach the agent with regard to engagement and etiquette<br>The customer was not satisfied due to an existing policy or process |
| 23 RMNF | Survey Question: Resolution<br>Milestone: Not Present<br>Alignment: Matching<br>Agent Response: No<br>Repeat Status: First | Potential concern with existing policy or process<br>Training concern affecting an individual agent or group of agents |
| 24 SMNF | Survey Question: Satisfaction<br>Milestone: Not Present<br>Alignment: Matching<br>Agent Response: No<br>Repeat Status: First | An opportunity exists to coach the agent with regard to engagement and etiquette<br>The customer was not satisfied due to an existing policy or process |
| 25 RANZ | Survey Question: Resolution<br>Milestone: Not Present<br>Alignment: Agent-Only<br>Agent Response: No<br>Repeat Status: Repeat | The agent is serving as a reliable proxy for the customer<br>The agent is requesting help related to call handling |
| 26 SANZ | Survey Question: Satisfaction<br>Milestone: Not Present<br>Alignment: Agent-Only<br>Agent Response: No<br>Repeat Status: Repeat | The agent is serving as a reliable proxy for the customer<br>The customer was not satisfied due to an existing policy or process<br>The agent is asking for help related to call handling |
| 27 RANF | Survey Question: Resolution<br>Milestone: Not Present<br>Alignment: Agent-Only<br>Agent Response: No<br>Repeat Status: First | The agent is serving as a reliable proxy for the customer<br>The agent is requesting help related to call handling |
| 28 SANF | Survey Question: Satisfaction<br>Milestone: Not Present<br>Alignment: Agent-Only<br>Agent Response: No<br>Repeat Status: First | The agent is serving as a reliable proxy for the customer<br>The customer was not satisfied due to an existing policy or process<br>The agent is asking for help related to call handling |
| 29 EAYZ | Survey Question: Satisfaction<br>Milestone: Present<br>Alignment: Agent-Only<br>Agent Response: Yes<br>Repeat Status: Repeat | The customer was satisfied with the service received<br>Data Assurance should validate satisfaction and policy/process adherence |
| 30 EAYF | Survey Question: Satisfaction<br>Milestone: Present<br>Alignment: Agent-Only<br>Agent Response: Yes<br>Repeat Status: First | The customer was satisfied with the service received<br>Data Assurance should validate satisfaction and policy/process adherence |
| 31 OAYZ | Survey Question: Resolution<br>Milestone: Present<br>Alignment: Agent-Only<br>Agent Response: Yes<br>Repeat Status: Repeat | The customer believes the issue was resolved correctly<br>Data Assurance should validate resolution method and policy/process adherence |
| 32 OAYF | Survey Question: Resolution<br>Milestone: Present<br>Alignment: Agent-Only<br>Agent Response: Yes<br>Repeat Status: First | The customer believes the issue was resolved correctly<br>Data Assurance should validate resolution method and policy/process adherence |
| 33 RXNZ | Survey Question: Resolution<br>Milestone: Not Present<br>Alignment: Not Matching<br>Agent Response: No<br>Repeat Status: Repeat | Agent error in inference of customer perception<br>Data Assurance should validate resolution method and policy/process adherence |
| 34 SXNZ | Survey Question: Satisfaction<br>Milestone: Not Present<br>Alignment: Not Matching<br>Agent Response: No<br>Repeat Status: Repeat | Agent error in inference of customer perception<br>Data Assurance should validate satisfaction and policy/process adherence |
| 35 RXNF | Survey Question: Resolution<br>Milestone: Not Present<br>Alignment: Not Matching<br>Agent Response: No<br>Repeat Status: First | Agent error in inference of customer perception<br>Data Assurance should validate resolution method and policy/process adherence |

TABLE 9-continued

Response Codes Priority Detailed Description

| CODE | DESCRIPTION | PRIME INDICATORS |
|---|---|---|
| 36 SXNF | Survey Question: Satisfaction<br>Milestone: Not Present<br>Alignment: Not Matching<br>Agent Response: No<br>Repeat Status: First | Agent error in inference of customer perception<br>Data Assurance should validate satisfaction and policy/process adherence |
| 37 RAYZ | Survey Question: Resolution<br>Milestone: Not Present<br>Alignment: Agent-Only<br>Agent Response: Yes<br>Repeat Status: Repeat | The customer believes the issue was resolved correctly<br>Data Assurance should validate resolution method and policy/process adherence |
| 38 SAYZ | Survey Question: Resolution<br>Milestone: Not Present<br>Alignment: Agent-Only<br>Agent Response: Yes<br>Repeat Status: Repeat | The customer was satisfied with the service received<br>Data Assurance should validate satisfaction and policy/process adherence |
| 39 RAYF | Survey Question: Resolution<br>Milestone: Not Present<br>Alignment: Agent-Only<br>Agent Response: Yes<br>Repeat Status: First | The customer believes the issue was resolved correctly<br>Data Assurance should validate resolution method and policy/process adherence |
| 40 SAYF | Survey Question: Satisfaction<br>Milestone: Not Present<br>Alignment: Agent Only<br>Agent Response: Yes<br>Repeat Status: First | The customer was satisfied with the service received<br>Data Assurance should validate satisfaction and policy/process adherence |
| 41 OMYZ | Survey Question: Resolution<br>Milestone: Present<br>Alignment: Matching<br>Agent Response: Yes<br>Repeat Status: Repeat | Very strong likelihood that the issue was resolved<br>Data Assurance should validate resolution and policy/process adherence |
| 42 OMYF | Survey Question: Resolution<br>Milestone: Present<br>Alignment: Matching<br>Agent Response: Yes<br>Repeat Status: First | Very strong likelihood that the issue was resolved<br>Data Assurance should validate resolution and policy/process |
| 43 EMYZ | Survey Question: Satisfaction<br>Milestone: Present<br>Alignment: Matching<br>Agent Response: Yes<br>Repeat Status: Repeat | Very strong likelihood that the customer was satisfied<br>Data Assurance should validate satisfaction and policy/process adherence |
| 44 EMYF | Survey Question: Satisfaction<br>Milestone: Present<br>Alignment: Matching<br>Agent Response: Yes<br>Repeat Status: First | Very strong likelihood that the customer was satisfied<br>Data Assurance should validate satisfaction and policy/process adherence |
| 45 RMYZ | Survey Question: Resolution<br>Milestone: Not Present<br>Alignment: Matching<br>Agent Response: Yes<br>Repeat Status: Repeat | Very strong likelihood that the issue was resolved<br>Data Assurance should validate resolution and policy/process |
| 46 RMYF | Survey Question: Resolution<br>Milestone: Not Present<br>Alignment: Matching<br>Agent Response: Yes<br>Repeat Status: First | Very strong likelihood that the issue was resolved<br>Data Assurance should validate resolution and policy/process |
| 47 SMYZ | Survey Question: Satisfaction<br>Milestone: Not Present<br>Alignment: Matching<br>Agent Response: Yes<br>Repeat Status: Repeat | Very strong likelihood that the customer was satisfied<br>Data Assurance should validate satisfaction and policy/process adherence |
| 48 SMYF | Survey Question: Satisfaction<br>Milestone: Not Present<br>Alignment: Matching<br>Agent Response: Yes<br>Repeat Status: First | Very strong likelihood that the customer was satisfied<br>Data Assurance should validate satisfaction and policy/process adherence |

Figure 4:
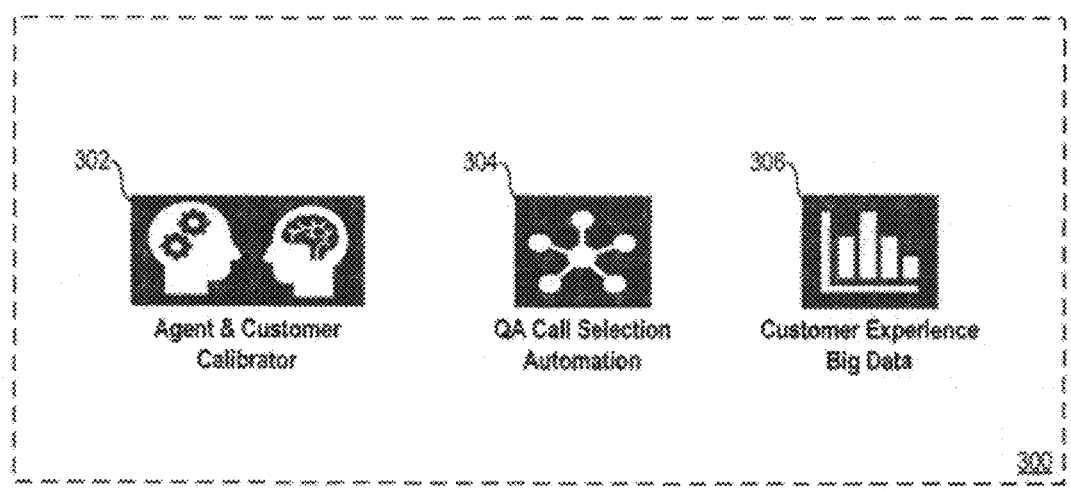
FIG. 4 depicts the balanced service process according to an embodiment of the present invention.

Referring now to FIG. 4, there is shown a balanced service process 208 utilizing Zacoustic performance management software 300 according to an embodiment of the present invention. A customer contact point and customer calibrator 302 provides that for every call handled, the customer contact point predict how customers are going to respond to existing survey questions. Zacoustic does not replace survey questions currently in use by a client; rather it fills the gap left by 85-95% of unresponsive customers. Utilizing the client's existing survey questions and venue, the responses are fed through an API 410 to Zacoustic database 416 (see FIG. 4 of U.S. Pat. No. 10,701,207, incorporated herein by reference above). The survey is imbedded into the client's CRM, and there is no impact to average handle time (AHT). Moreover, there is no personally identifiable information (PII) or payment card industry (PCI) data transmitted. Agent-required completion of the predictive survey does not contribute to AHT increase; rather AHT is lowered through exposed best practice.

When actual customer survey responses are received, they are compared to agent predictions for that call. The Match Rate metric is based on accurate agent predictions (e.g., Matched Responses/Total Match Opportunities=Match Rate). As the Match Rate improves, agents become more aware of customer sentiment and are more likely to take steps to deliver improved CX. For example, agents start at about 40%, and improve to about 90% within four weeks. As agents begin to understand that they are not self-evaluating, rather predicting, the accuracy of their predictions improves. As agents demonstrate sustained accurate predictions, Zacoustic trusts their data just as though it came from the customer. Zacoustic algorithm only trusts agent-generated data after sustained accurate predictions (i.e., Match Rate) are demonstrated by the agent. This fills the survey gap generating statistically sound 100% customer feedback using the agent as a reliable customer proxy.

It should be noted at this juncture that this calibration process may be used not only with the human agents 228 and human supervisors 232, but also with BOTs, Chat BOTs, etc. 210 coupled to Zacoustic 208.

Attributes of every agent prediction-call disposition and AHT may be auto-populated-enabling complex CX big data. Other factors such as customer experience score, issue resolution score, repeat call status, net promoter scores, etc. may also be used. With prior art approaches, QA randomly selects calls, the average FCR is 70%, and resolved calls are often evaluated. With the Zacoustic approach described herein, good I bad calls are separated, calls which have not been resolved are automatically sent to QA, resulting in a great improvement to CX. It removes denial from agent-thinking with regard to candid feedback; when agents predict unfavorable responses, they are open to coaching. As shown in Table 10 below, the addition of agent calibrated CX and FCR data alongside AHT for every call, by agent and call driver is an industry first and exposes biggest pain points and best practices.

TABLE 10

Zacoustic Reporting

| Call Driver: Registration | Calls | AHT | CX | FCR |
|---|---|---|---|---|
| Total Queue Performance | 9,952 | 11:12 | 44% | 28% |
| Agent: Janet Lane | 327 | 6:44 | 88% | 74% |

There are numerous embodiments of balanced service processes according to FIGS. 4-9 of U.S. Pat. No. 10,701,207, incorporated herein by reference above.

Figure 2:
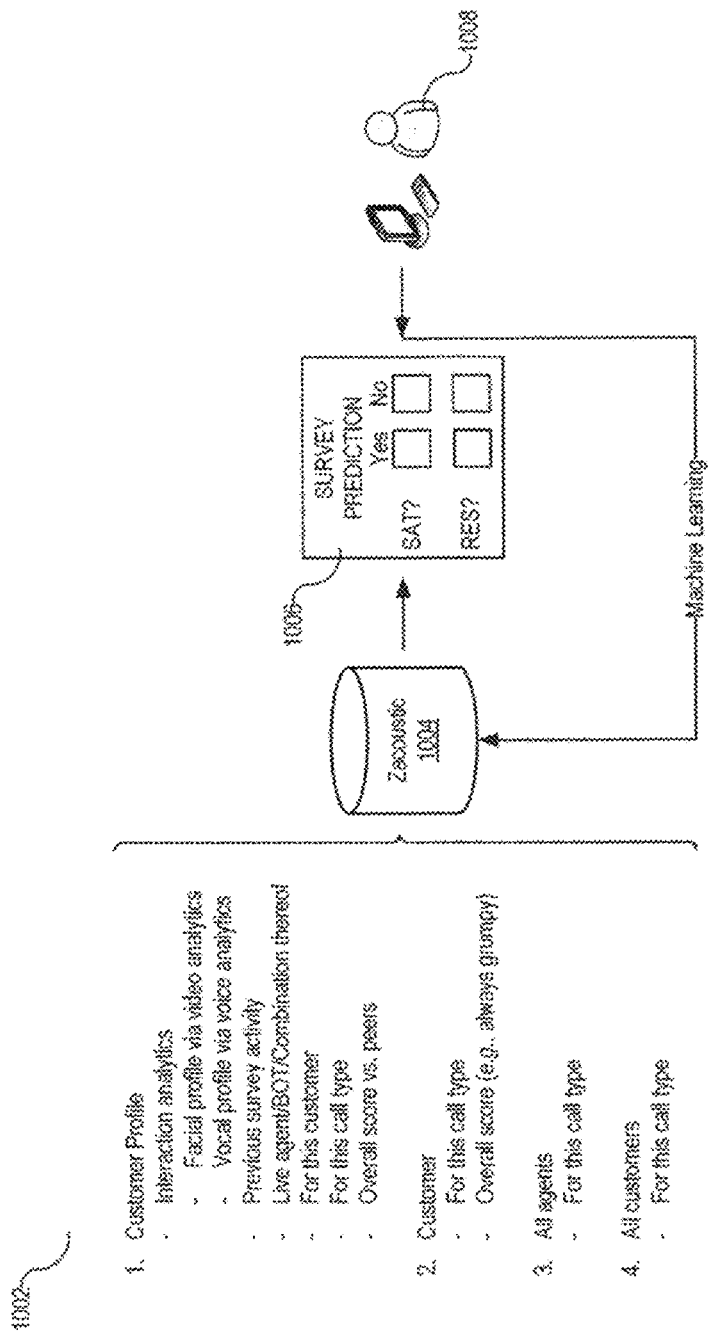
FIG. 2 depicts a balanced service process according to an embodiment of the present invention including machine learning.

Referring now to FIG. 2, a balanced service process according to another embodiment of the present invention including machine learning is shown. Cause drivers 1002 such as those to the left of the Zacoustic database 1004 may be input into the database 1004 to produce an agent predictive survey 1006 (see also FIG. 3). If an actual customer 1008 responds to surveys sent to her/him, Zacoustic may compare the two, ascertain difference/similarities, and feedback such as machine learning to the Zacoustic database.

Figure 5:
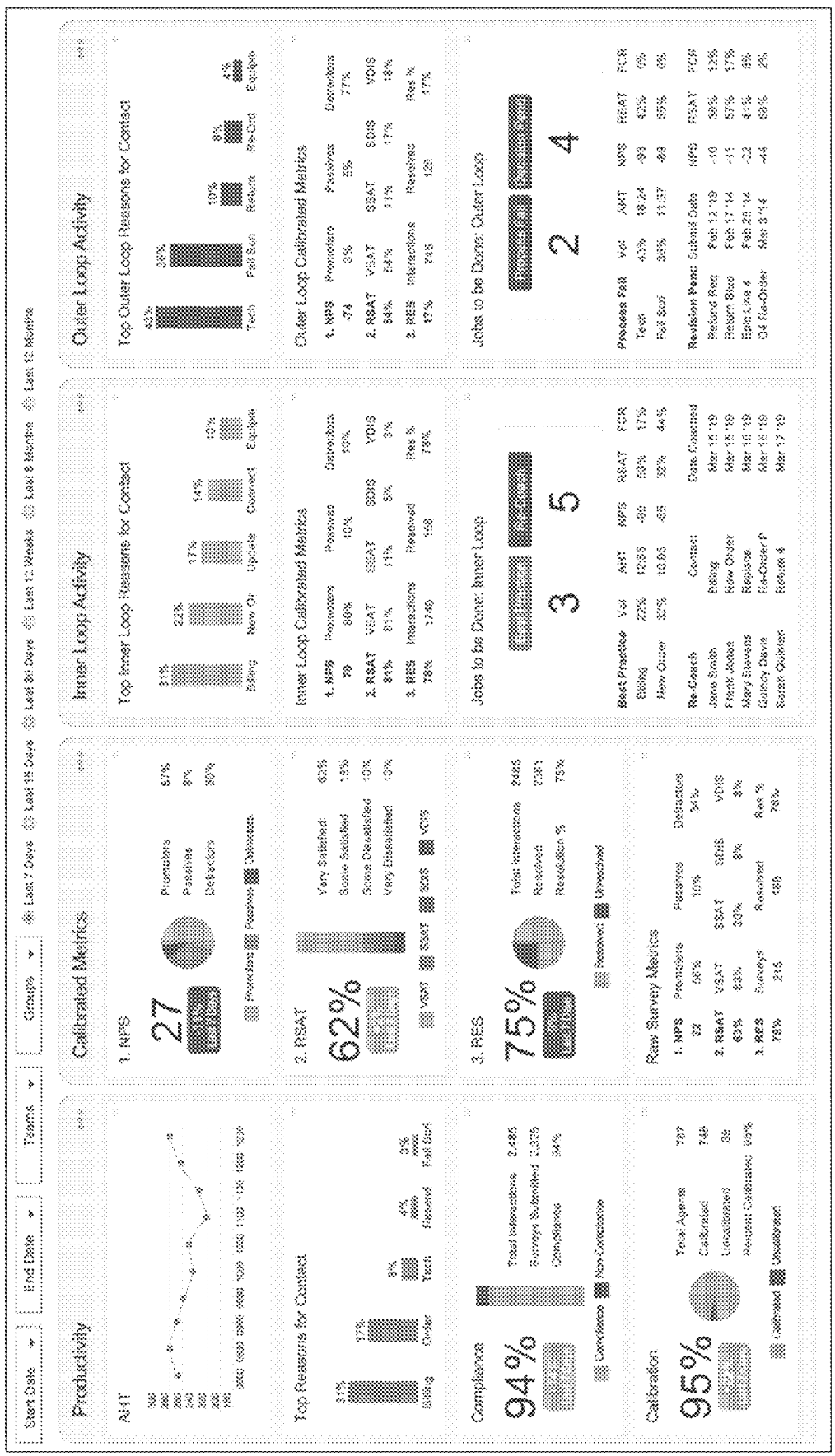
FIG. 5 shows a machine learning flowchart for use with the balanced service process according to an embodiment of the present invention.
Figure 6:
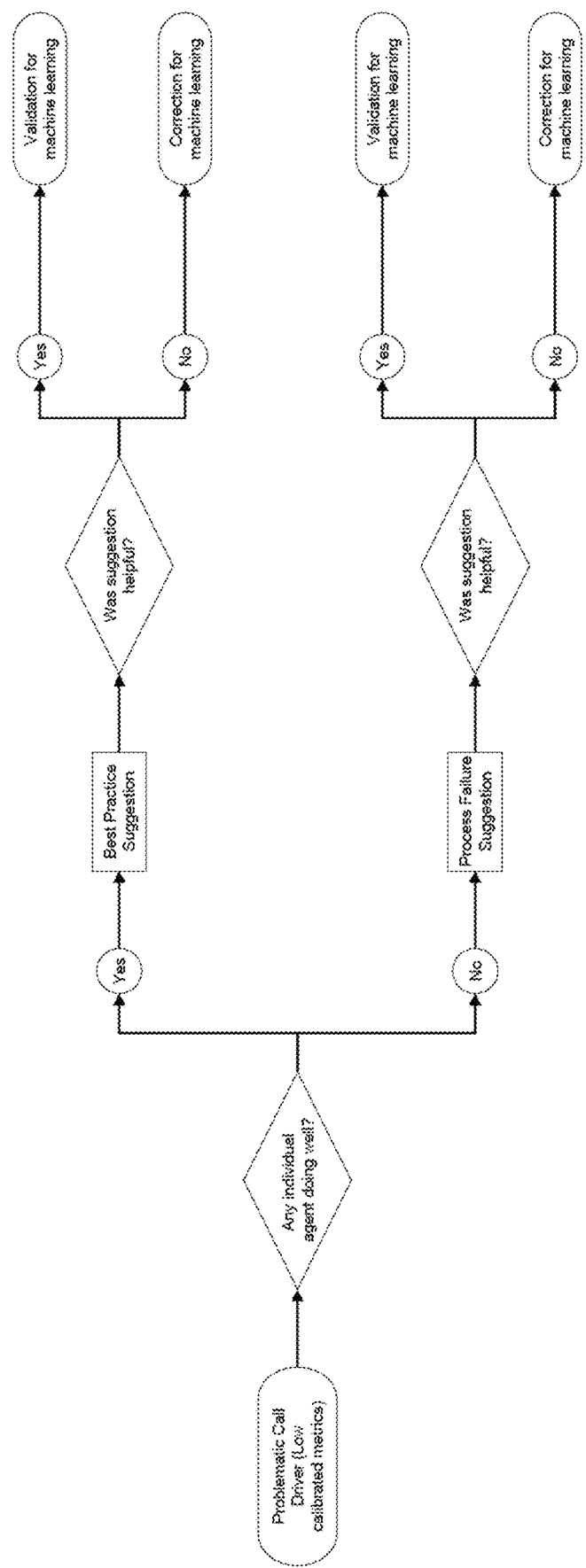
FIG. 6 depicts a flowchart according to an embodiment of the present invention for validating or correcting whether user input was helpful or not in assessing machine learning.

Referring now to FIG. 5, there is shown an executive dashboard for use with the balanced service process according to an embodiment of the present invention. The user can select from the following in the "Search" cluster: (1) User can select by date range by entering the dates—when this is done, only the data for the date range entered appears; (2) Call ID—User can search for a record via call ID; (3) User clicks "Select" and the information is displayed in the panel.

Calibration illustrates the percentage of agents calibrated on all survey questions by calculating: (TOTAL AGENTS CALIBATED ON ALL SURVEY QUESTIONS/TOTAL AGENTS). A Sub-Calibration Calculation may be determined by calculating: (TOTAL CALIBRATED SURVEY QUESTIONS/TOTAL SURVEY QUESTIONS).

Reason for contact is only moved to the outer loop if the following process is followed (i.e. all Reasons for Contact remain in the Inner Loop until moved through the following process). When a problematic Reason for Contact (RFC) is identified and NO agents are performing at an acceptable level (defined by Archer's stack ranking system), the "JOBS TO BE DONE: OUTER LOOP"/Process Fail (Suggested Process Failure) populates for each suggested process failure identified. When user clicks on that number they are brought to the "SUGGESTED PROCESS FAILURE" screen, which itemize each suggested process failure. The user clicks the box next to the suggested process failure that is to be dispositioned and clicks "Select." The best OVERALL performing agents appear in the panel. The calls selected should be. (I) HIGH HANDLE TIME, (II) NEGATIVE CALIBRATED PREDICTIONS for all survey questions (we assume that this shows how the best agents are struggling with the reason for contact in question). When the user finds the call they feel best represents the issue, they may click the box next to the agent's name and click "Select". They are brought to the "Process Failure Definition" screen with the call selected in the previous screen attached as the "Specimen" (which will remain attached to the card and able to be reviewed by whomever is in charge of dispositioning the RFC. The user may describe the reason for the process failure in the boxes below: Title: The user must select a UNIQUE title as this is what will appear in the PROCESS FAILURE LIBRARY (no different than saving a document in MS Word); Description: The user may describe the problem overall; Current Process: User describes the process that is leading to the failure; Proposed Process: User suggests a solution to fix the problem. User clicks the "Submit" button and the card is indexed, accessed by the PROCESS FAILURE LIBRARY. When users open a Process Failure card from the PROCESS FAILURE LIBRARY they can see the description provided (non-editable) and disposition the Process Failure: Assign Inner Loop: Means that it isn't a process failure or that the process failure has been fixed; Assign Outer Loop: Means that the process failure will reside in the outer loop (and metrics within the dashboard shown in FIG. 5 will reflect that); and Pending: Means the user needs time to investigate, etc.

Process Failure Alerting: When a Process Failure ("PF") is detected, a notification appears on the dashboard shown in FIG. 5. When the user clicks the notification, they are brought to the Suggested PF Library.

Process Failure Suggestion Selection: User checks the box of the PF they want to define. User then presses a "Select" button and is brought to the Best Performers Library with links provided to call recordings wherein the agents submitted negative predictions. Users may then press the "Listen" button to listen to the call/review the chat transcript. Users may then click the box for the interaction/agent that they want to use as a Specimen for the PF Definition. Finally, user may click "Select" and be brought to the PF Definition screen for the same call.

Process Failure Definition: Users may create a referenceable title. Users may then populate definition boxes. Finally, Users may click "Submit," and that Process Failure Definition enters the "Process Failure Suggestion Library."

Process Failure Library: User can select date range. Then, the user can search for titles, and can select one or all Reason for Contact. For example, FreshDoor may be a fictious company used for demonstration purposes. The Reasons for Contact may be: (a) Skip Delivery; (b) Reschedule Meal Delivery; (c) Update Delivery Address; (d) Not Home Options; (e) Track Delivery; (f) Change Delivery Window; (g) Recycling; (h) View Credits; (i) Meal E-Gift Card; (j) Apply for Voucher; (k) Gift Card; (l) Purchase Gift Card; (m) MarketPlace Order; (n) Return MarketPlace Order; and/or (o) MarketPlace shipping.

The user then may select the status by selecting "Open/Pending/Assign Inner Loop/Assign Outer Loop."

A Helpful/Not Helpful button may allow the user to inform the system as to whether the suggested process failure interactions were either helpful or not. Ultimately, this data will be used for machine learning to help AI functionality improve the selection of suggested interactions. Reporting may be generated for Zacoustic to understand which interactions were helpful, and those that were not as shown in the flowchart according to FIG. 6.

Referring now to FIG. 7, there is shown a dashboard for best practice suggestions according to a best practice push according to an embodiment of the present invention.

Figure 8:
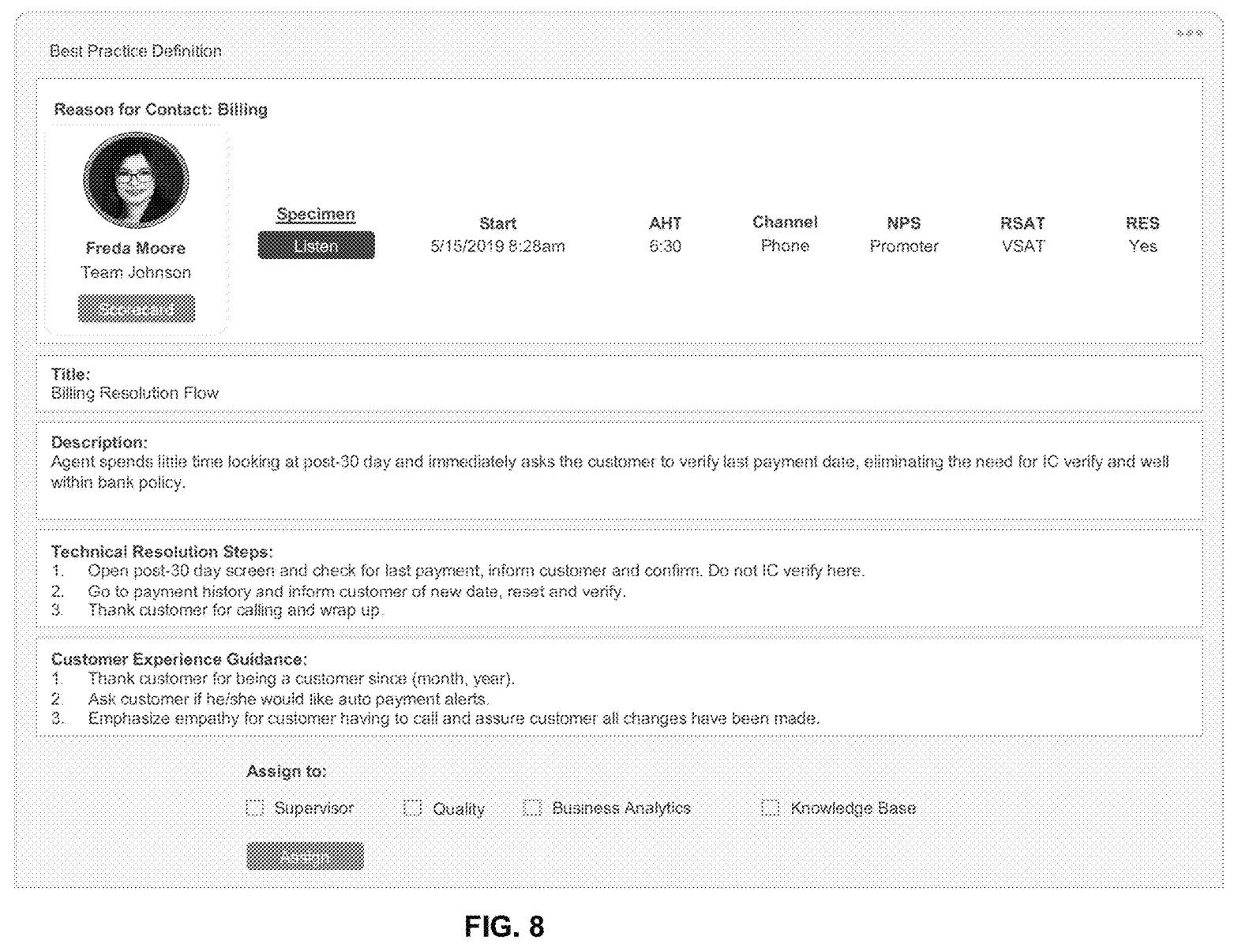

Referring now to FIG. 8, there is shown a dashboard for best practice definitions according to a best practice push according to an embodiment of the present invention.

Figure 9:
FIG. 9 depicts a QA evaluation form according to an embodiment of the present invention.

Referring now to FIG. 9, there is shown a QA evaluation form according to an embodiment of the present invention.

Figure 10A:
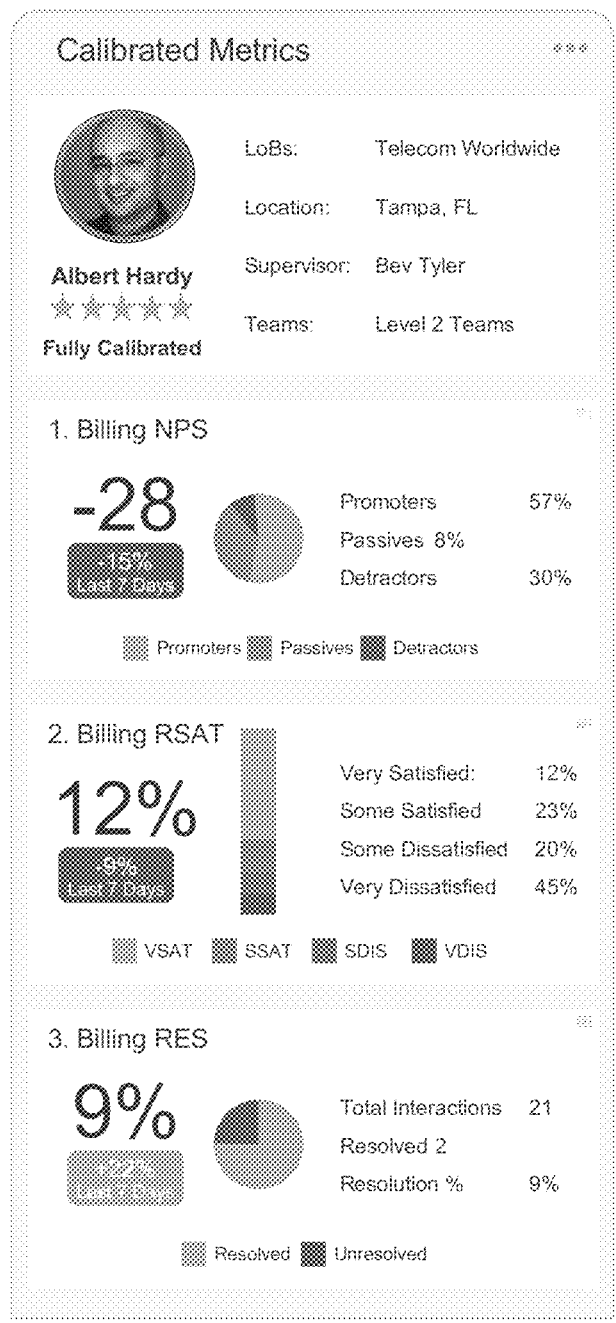
FIGS. 10A-10C depict a QA coaching form according to an embodiment of the present invention.
Figure 10B:
Figure 10C:

Referring now to FIGS. 10A-10C, there is shown a QA coaching form according to an embodiment of the present invention.

Figure 11A:
FIGS. 11A and 11B depict an agent scorecard according to an embodiment of the present invention.
Figure 11B:

Referring now to FIGS. 11A and 11B, there is shown an agent scorecard according to an embodiment of the present invention.

Figure 12A:
FIGS. 12A-12C depict a supervisor dashboard according to an embodiment of the present invention.
Figure 12B:
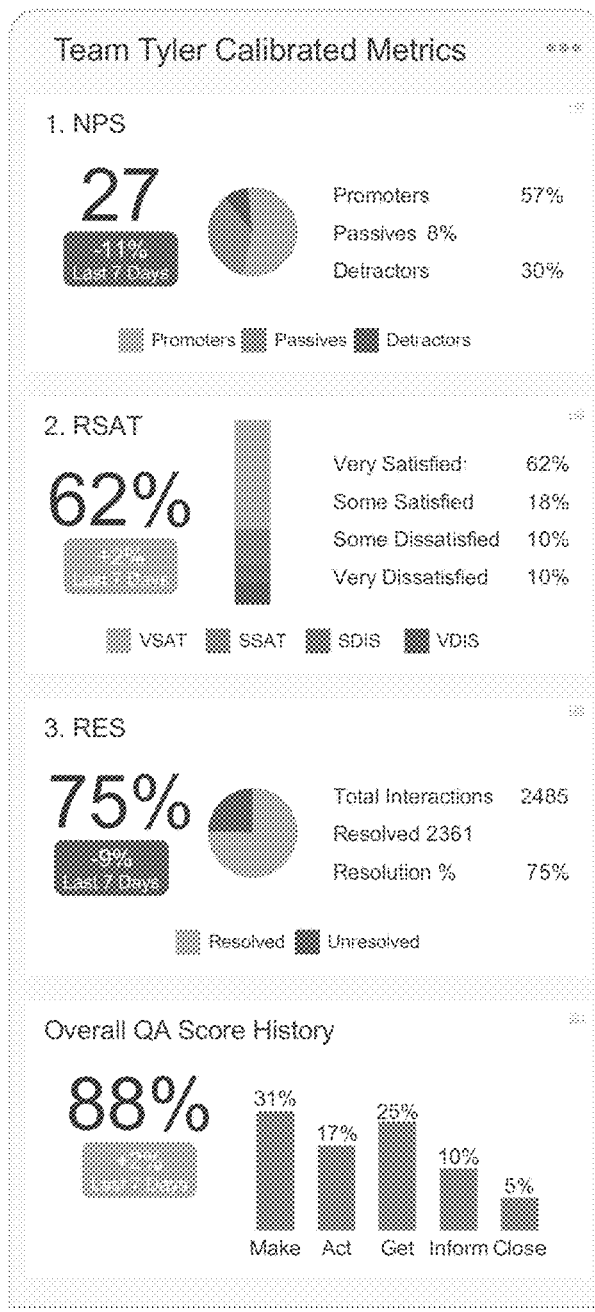
Figures 12B, 12C:

Referring now to FIGS. 12A-12C, there is shown a supervisor dashboard according to an embodiment of the present invention.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A system for customer contact management, comprising:
    a customer contact environment comprising a database and a plurality of agents, wherein said contact environment is coupled to receive customer contacts from a network and present each of the customer contacts to one or more of said plurality of agents;
    a balanced service process, comprising:
        an agent survey for determining and managing real-time, intraday, and historical resolver disposition of contact (RDP) and agents' belief about customers' view on contact resolution and customer satisfaction;
        a customer survey for determining and managing real-time, intraday, and historical customer input/view on disposition of contact (CDP);
        wherein said process for aligning the agent and the customer on each contact comprises one or more of the following:
        a data generator for determining first contact resolution (FCR) rates and customer satisfaction (CSAT) from the results of said agent survey and said customer survey, wherein said results are stored in said database;
        a first processor within said database for dynamically reporting issues driving contact volume;
        a second processor within said database for determining every contact that was not resolved;
        a third processor within said database for assigning a plurality of response codes each of which is indicative of an outcome of said agent survey and said customer survey for each of the contacts;
        a machine learning processor coupled to said database for processing a response by said customer to said customer survey; and
        a closed loop channel within said database to define, report and correct actions and trending issues that impede FCR and CSAT.

2. The system according to claim 1, wherein said issues driving contact volume comprise said real-time, intraday, and historical RDP, CDP, FCR and CSAT, and exception rates.

3. The system according to claim 1, wherein said trending issues that impede FCR and CSAT are based on said dynamically reported issues driving contact volume.

4. The system according to claim 1, wherein said agent is prompted with said agent survey upon completion of each said contact.

5. The system according to claim 4, wherein said agent is prompted during said agent survey to answer whether the customer believes the issue causing each said contact was resolved or not.

6. The system according to claim 4, wherein said agent is prompted during said agent survey to answer whether the customer for each said contact was satisfied or not.

7. The system according to claim 1, wherein said customer is prompted with said customer survey upon completion of each said contact.

8. The system according to claim 7, wherein said customer is prompted during said customer survey to answer whether the issue causing each said contact was resolved or not.

9. The system according to claim 7, wherein said customer is prompted during said customer survey to answer whether the customer for each said contact was satisfied or not.

10. The system according to claim 1, wherein said response codes are generated after said agent completes said agent survey and after said customer either completes said customer survey or has had the opportunity to complete said customer survey but did not.

11. The system according to claim 1, wherein said response codes are prioritized.

12. The system according to claim 11, wherein said response codes are indicative of one or more of congruency between agent-customer survey responses, the survey question responded to and, whether or not the call was a repeat for the same concern.

13. The system according to claim 1, wherein said contact environment further comprises a chat bot.

14. The system according to claim 1, wherein said contact environment further comprises a bot coupled to said database.

15. The system according to claim 14, wherein said bot is adapted to be calibrated by the data generated in said balanced service process.

16. The system according to claim 15, wherein each said agent may be calibrated by the data generated in said balanced service process.

17. The system according to claim 15, wherein said calibrated bot may prompt each said agent.

18. The system according to claim 15, wherein said calibrated bot is adapted for machine learning based on the data generated in said balance service process and stored in said database.

19. The system according to claim 15, wherein said calibrated bot may generate a unique customer survey for each unique customer contact.

20. The system according to claim 15, wherein said unique customer survey is generated by said calibrated bot from data input by said machine learning processor.

21. The system according to claim 1, wherein said machine learning processor is adapted to process data selected from the group comprising a customer profile, data from said customer for contacts of this type; data from all agents for contacts of this type, and data from all customers for contacts of this type.

22. The system according to claim 21, where said customer profile comprises data regarding interaction analysis, previous survey results, whether said data was input by said agent, a bot, or a combination thereof.

23. The system according to claim 22, wherein said interaction analysis comprises a facial profile via video analytics.

24. The system according to claim 22, wherein said interaction analysis comprises a vocal profile via voice analytics.

* * * * *